United States Patent [19]

Gillis et al.

[11] 4,284,218
[45] Aug. 18, 1981

[54] ATRAS SPARE TIRE MOUNTING KIT

[76] Inventors: James P. Gillis; John W. Robinson, Jr., both of 197 Scribner Ave., Norwalk, Conn. 06854

[21] Appl. No.: 30,742

[22] Filed: May 22, 1979

[51] Int. Cl.³ .................... B62D 43/02; B60R 13/00
[52] U.S. Cl. .................. 224/42.06; 206/223; 296/1 C; 296/37.2
[58] Field of Search ............... 224/42.03 A, 42.06, 224/42.2, 42.24, 42.26, 42.3, 42.45 R; 296/1 C, 37.2, 37.3; 206/223

[56] References Cited

U.S. PATENT DOCUMENTS

| | | | |
|---|---|---|---|
| 1,827,095 | 10/1931 | McCormick | 224/42.2 |
| 1,982,568 | 11/1934 | Boss | 224/42.12 |
| 2,553,686 | 5/1951 | Stromberg | 224/42.21 |
| 2,626,181 | 1/1953 | Renaud, Jr. et al. | 224/42.06 |
| 2,733,847 | 2/1956 | Pyes | 224/42.21 |
| 2,805,807 | 9/1957 | Slack | 224/42.24 |
| 3,999,693 | 12/1976 | Cooper, Sr. | 224/42.03 A |

Primary Examiner—Stephen Marcus

[57] ABSTRACT

The ATRAS (Spanish word for back or behind) Spare Tire Mounting Kit is designed specifically for installation on the rear end of Ford Granada and Mercury Monarch automobiles, years 1975 to 1979, to include both two and four-door models. The primary purpose of the ATRAS Spare Tire Mounting Kit is to increase the usable interior trunk capacity by as much as 31 percent. This is accomplished by removing the spare tire from the trunk interior and mounting it on the rear of the car.

The ATRAS Spare Tire Mounting Kit is designed for utility, convenience and appearance.

Its unique feature is the integral steel mounting device which is bolted to the rear of the car body in such a manner as to encircle the original gas-filler portal, serving as the protective housing for the 8" curved metal gas-filler extension tube as well as the wheel hub upon which the spare tire is mounted. A studded metal cinch with an ATRAS anti-theft locking device is specifically designed, as are the telescoping bumper extension mountings which conform to all existing safety standards.

5 Claims, 18 Drawing Figures

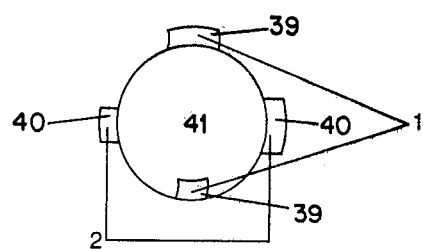
FIG. 6
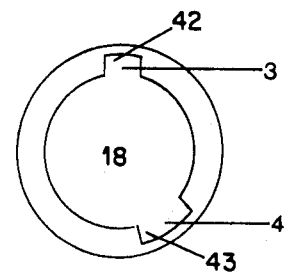
FIG. 7
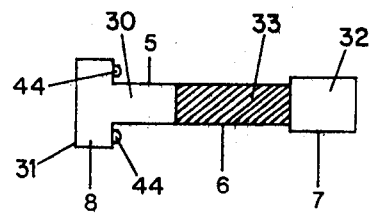
FIG. 5 (SEC. 2-2, FIG. 18)
FIG. 12
FIG. 11

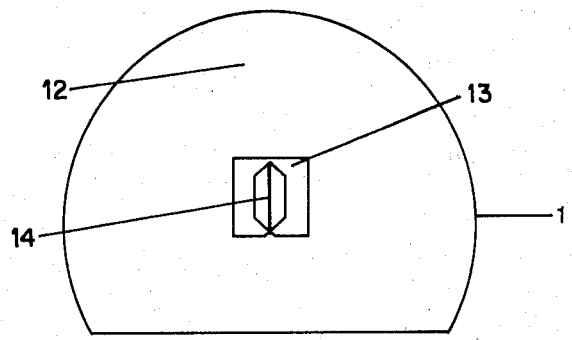
FIG. 8
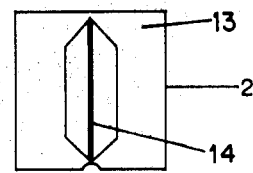
FIG. 13
FIG. 9
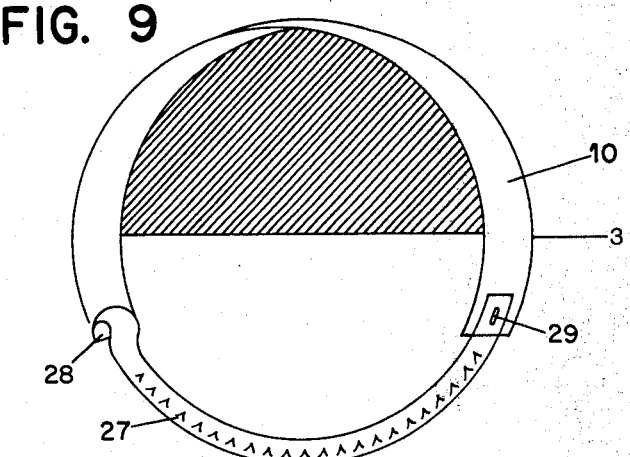
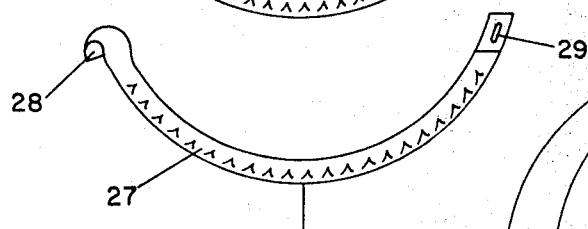
FIG. 10
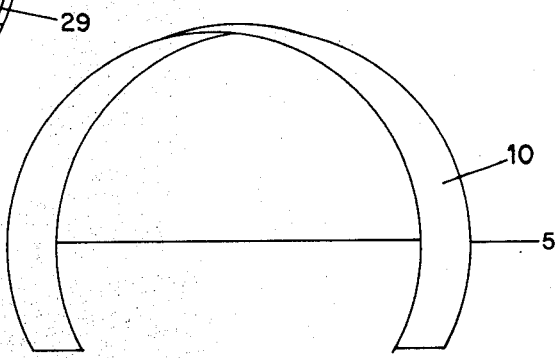
FIG. 14

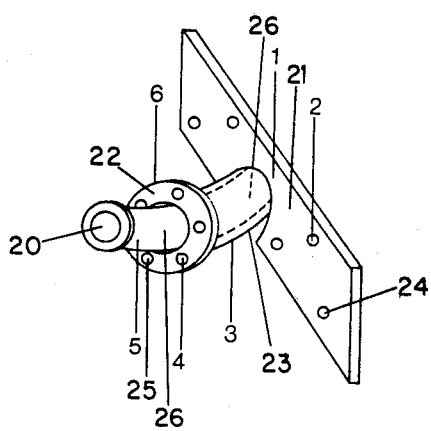
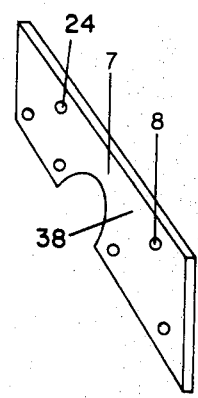
FIG. 15  FIG. 16
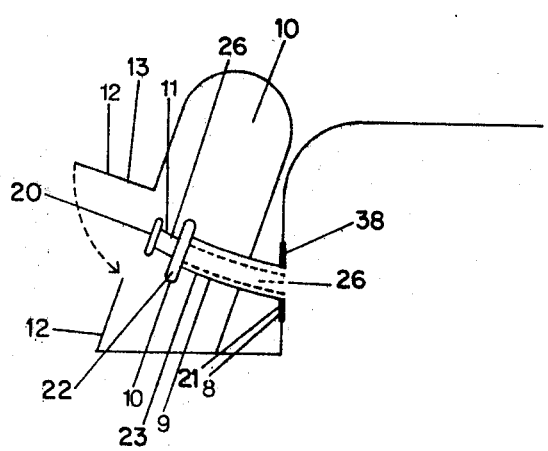
FIG. 17 (SEC. 3-3, FIG. 4)

ATRAS SPARE TIRE MOUNTING KIT

BRIEF SUMMARY OF THE INVENTION

The ATRAS Spare Tire Mounting Kit is designed to offer owners of Ford Granada and Mercury Monarch automobiles a minimum of twenty-seven (27) percent more usuable trunk space by removing the spare tire and mounting it on the rear outside the trunk. To accomplish this, a combination steel mounting/gas-filler extension tube protector/wheel hub terminal has been designed. Before installation, the rear car bumper is removed by disengaging two "impact" rods.

The combination steel mounting assembly is installed by boring three (3) precisely placed holes (to conform to the holes on the mounting plate) on either side of the existing gas filler portal, positioning the 16" long forged steel apparatus on the outside of the car body to line up with the matching holes and placing a matching flat steel plate with identically bored holes inside the trunk. Before inserting bolts through the holes and securing the two metal plates together with machined nuts, the combination mounting device is set aside.

The gas cap which is located in the center of the rear car panel is then removed. An examination of the gas cap's under side will reveal two (2) flat and two (2) perpendicular flanges. The forward end of the metal gas-filler extension tube has identically arranged flanges. This end of the extension tube is locked into the gas portal by inserting the two (2) flat flanges in the two (2) respective receivers on the gas portal lip and turning clockwise 90 degrees. The other end of the extension tube has receivers identical to the two (2) on the gas portal lip and the gas cap is then screwed onto the end of the tube, again, by inserting the two (2) flat flanges and turning clockwise 90 degrees.

The hollow tube on the combination metal mounting device is then lowered, encompassing the gas-filler extension tube. When this is in place, the steel plates inside and outside of the trunk will be aligned perfectly with the six (6) pre-bored holes and the two plates are then bolted together with matching nuts.

The end of the gas filler-extension tube with gas cap installed will protrude several inches beyond the wheel hub terminal at the end of the hollow metal tube enclosing the gas-filler tube. The ATRAS Spare Tire Mounting Kit is now ready to receive the spare tire. The wheel hub contains five (5) bolts identical in size and spacing as the hub on each of the car wheels. The spare tire is positioned on the hub and secured with five (5) lugs using the standard equipment jack handle.

When the tire is in place the heavy duty, color coordinated fiberglass spare tire cover is put into place around the tire and secured underneath by the studded metal cinch with spring lock. The gas cap on the extension tube will be immediately accessible when the hinged gas port door on the wheel cover is raised. The ATRAS does not obstruct entry to the trunk which continues to be opened in the normal manner.

BRIEF DESCRIPTION OF THE DRAWINGS

FIG. 5 is a sectional view of one of the two bumper telescoping rod assemblies in the plane of the line 2—2 of FIG. 18.

FIG. 6 is a vertical view of the forward end of the gasoline filler extension tube.

FIG. 7 is a vertical view of the original gas inlet on the rear of the car.

FIG. 8 is a vertical view of the ATRAS rear facing.

FIG. 9 is a vertical view of the ATRAS kit with the rear facing removed and metal studded cinch in position.

FIG. 10 is a view of the cinch in a detached position.

FIG. 11 is a plan view of the plastic insert sheet.

FIG. 12 is a sectional view of the T-shaped plastic molding.

FIG. 13 is a view of the gas port filler door with identifying emblem.

FIG. 14 is a vertical view of the backside of the ATRAS kit.

FIG. 15 is a view of the mounting plate, wheel hub, gas filler extension tube and protective housing for same.

FIG. 16 is a view of the matching mounting plate to be positioned inside the car trunk.

FIG. 17 is a sectional view in the plane of the line 3—3 of FIG. 4.

DESCRIPTION OF THE PREFERRED EMBODIMENT

Figure 1:
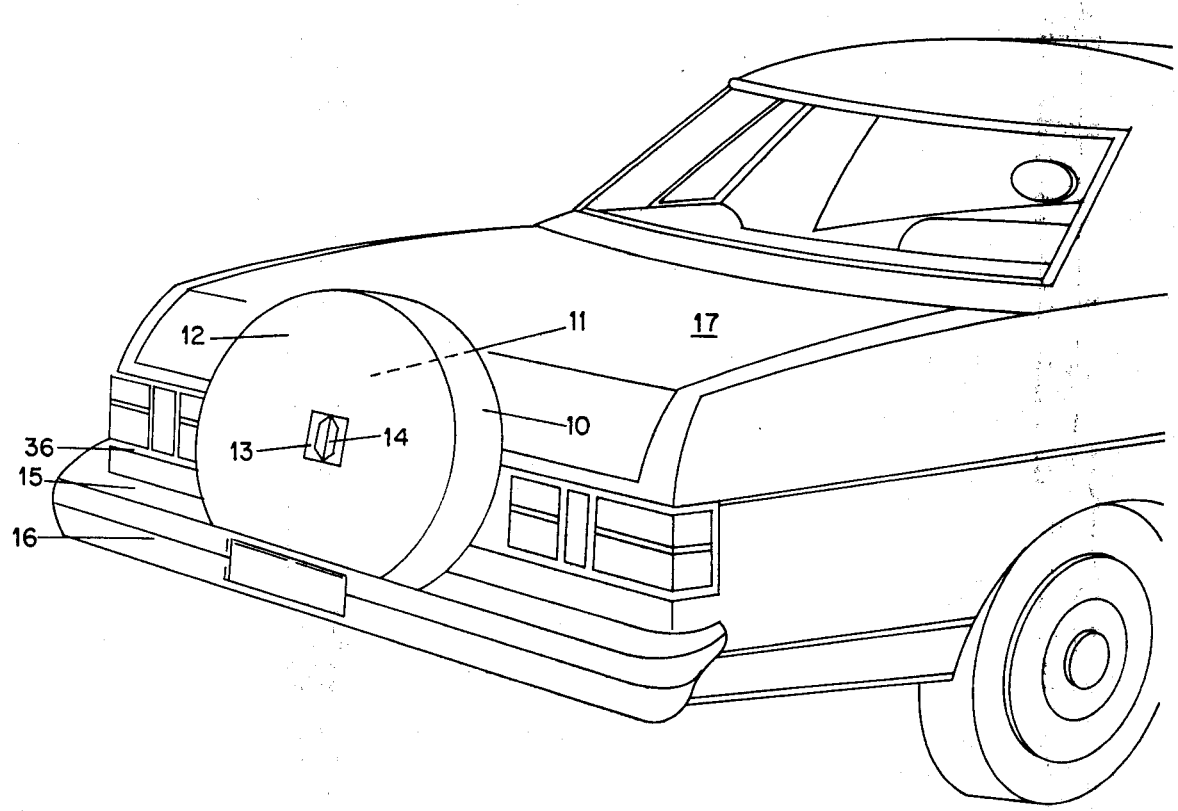
FIG. 1 is a rear view of the ATRAS SPARE TIRE MOUNTING KIT, embodying our invention, and of the rear section of a Ford Granada (or Mercury Monarch) automobile on which the kit is designed to be mounted.
Figure 2:
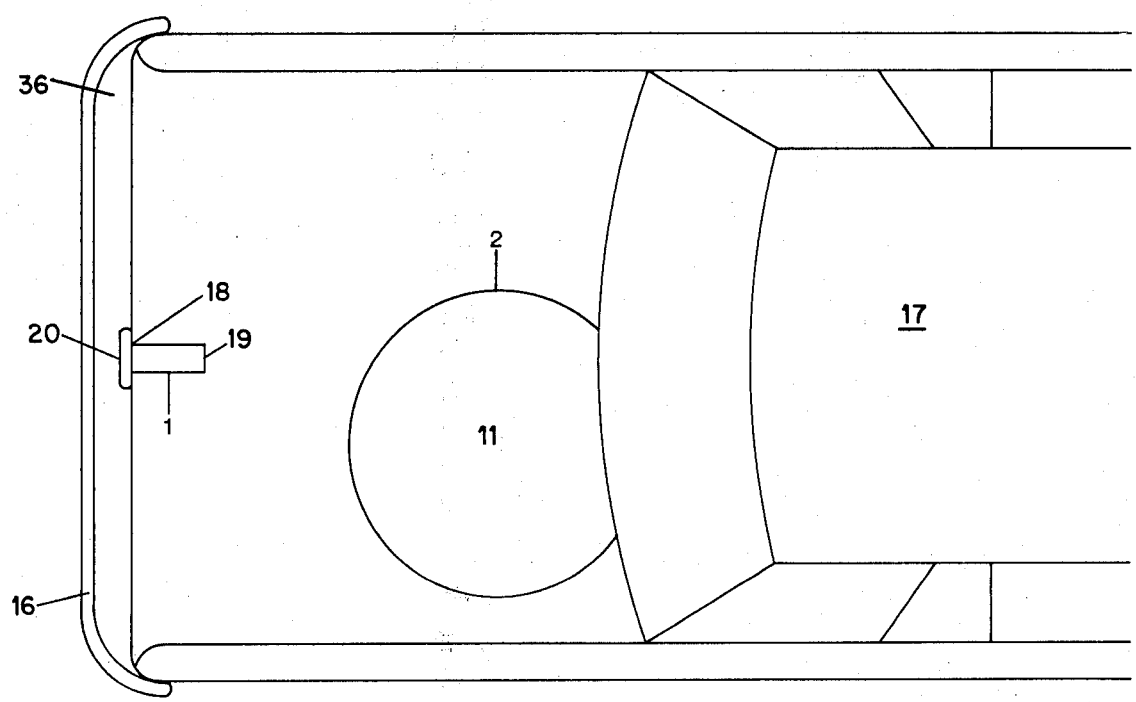
FIG. 2 is a plan view of the car with trunk lid removed.
Figure 3:
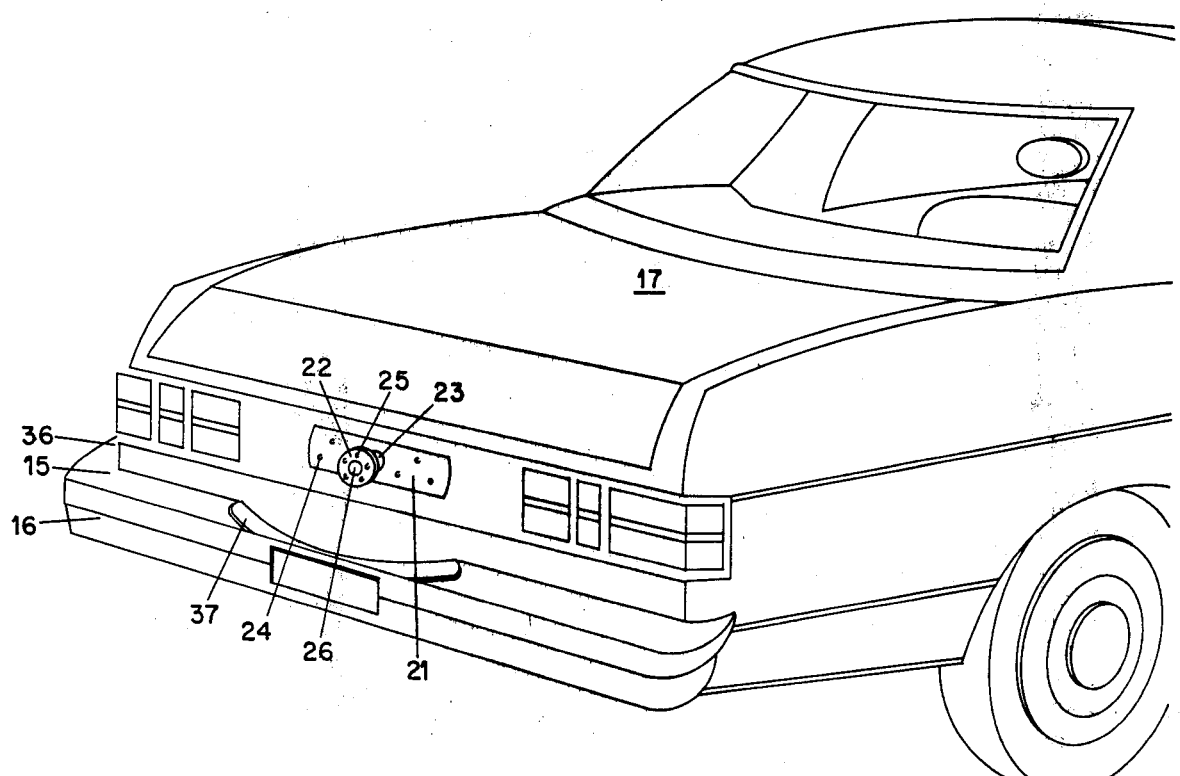
FIG. 3 is a rear view of the car with the spare tire and ATRAS kit removed showing the unit upon which same are mounted.
Figure 4:
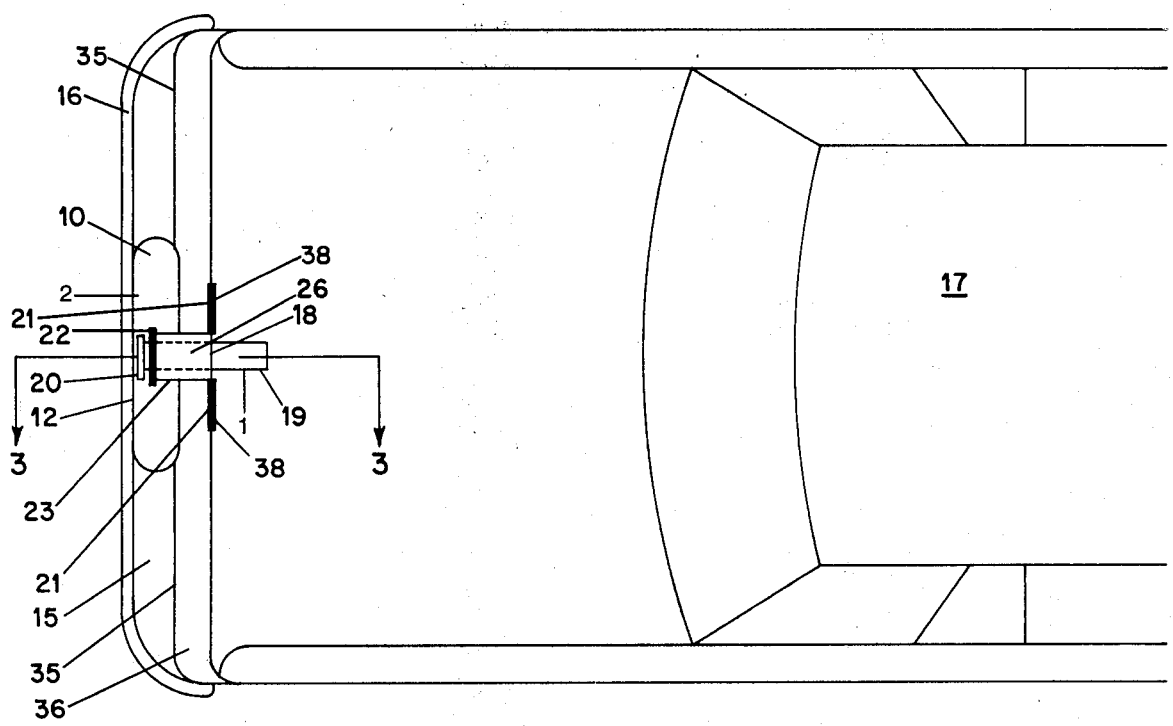
FIG. 4 is a plan view with out invention mounted on the car.
Figure 18:
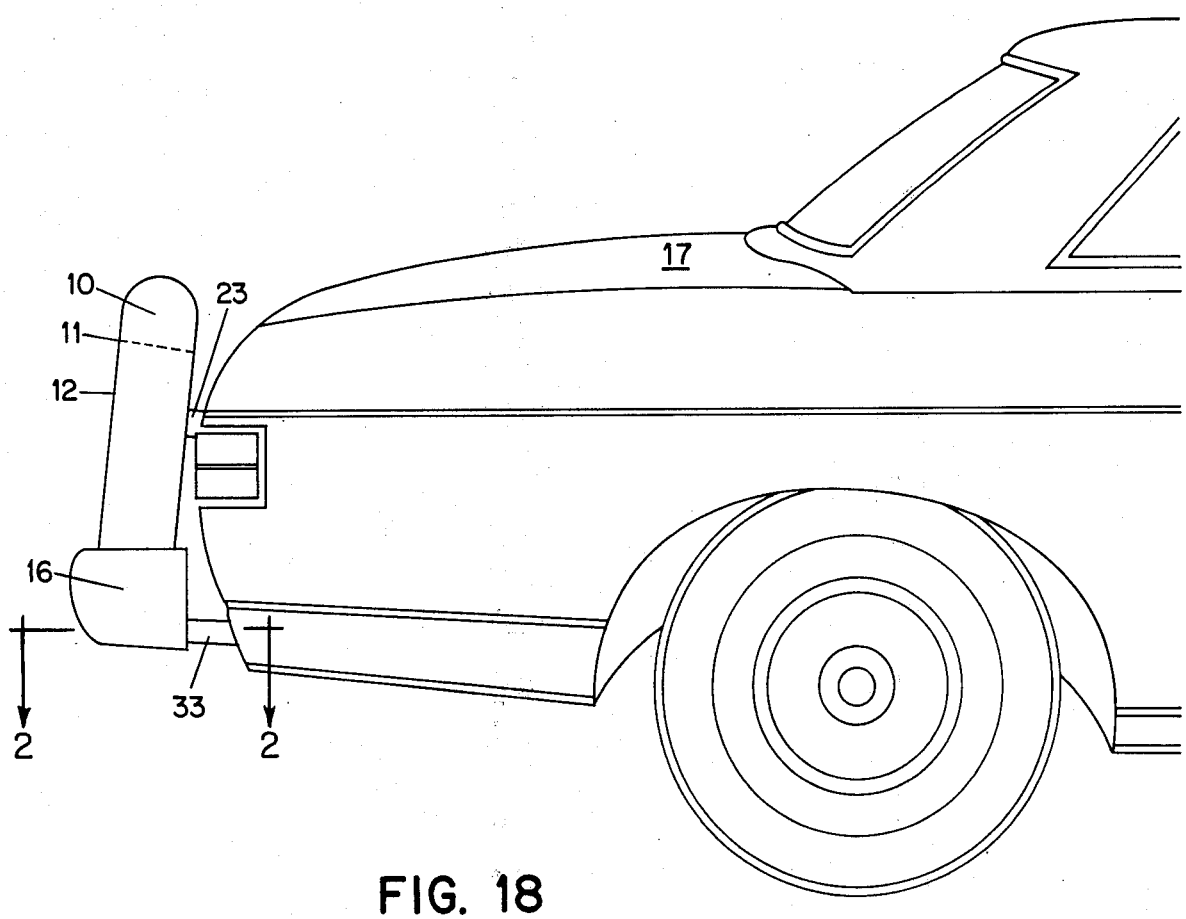
FIG. 18 is an elevational side view of the car with the ATRAS kit installed.

In the preferred embodiment of the invention shown in the drawings, the ATRAS SPARE TIRE MOUNTING KIT comprises a housing 10 which encompasses the repositioned automobile spare tire 11, a rear facing 12 with gas port filler door 13 and identifying emblem 14, a plastic insert sheet 15 to cover void created by rearwardly extending the autombile bumper 16 sufficiently to accommodate the housing 10.

As originally designed, the Ford Granada and Mercury Monarch automobiles 17 on which the Kit is designed to be mounted have center positioned gas inlets 18, 19 and a gas cap 20 which is flush with the rear of the car 17. The gas cap 20 is removed to permit the installation of a metal unit consisting of a mounting plate 21, wheel hub 22 and the gas filler extension tube protective housing 23. Inside the trunk of the car 17 a matching metal mounting plate 38 is aligned with exterior mounting plate 21.

Matching bolt holes 24 are drilled in the car's rear panel and bolts of a suitable length are inserted through bolt holes 24 and matching nuts rigidly attach mounting plates 21, 38 to car 17. Nuts 44 on two lateral flanged steel plates 31 are unscrewed and the car bumper 16 is removed.

The housing 10 is placed in a straddle position over the gas filler extension tube protective housing 23 and the spare tire 11 is placed inside the housing 10 and positioned on the wheel hub 22 and secured to same by wheel lugs 25. The gasoline filler extension tube 26 is inserted into the gasoline filler extension tube protective housing 23 and secured by flanges 39, 40 on the gasoline filler extension tube's forward end 41 locking with the receivers 42, 43 on the original gas inlet 18.

The rear facing 12 is positioned inside lip of housing 10 and metal studded cinch 27 secures rear facing 12 to housing 10 by interlocking lips 28 and locking device 29.

Two original equipment bumper telescoping rods 30 and two lateral flanged steel plates 31 are removed from their respective sleeves 32. Two expressly designed lateral units, each consisting of a bumper extension telescoping rod 33 of a length to accommodate the rearward positioning of the bumper 16 and the flanged steel plates 31, are positioned in their respective sleeves 32 and the bumper 16 is reattached to the car 17 using the original nuts 44.

The plastic insert sheet 15 is bolted to bumper 16 using bolt holes 34 and matching nuts. T-shaped plastic molding 35 joins original plastic sheet 36 and plastic insert sheet 15. Plastic insert sheet cutout 37 permits spare tire 11 to be lowered below top edge of bumper 16.

Thus the easily installed ATRAS SPARE TIRE MOUNTING KIT provides the Ford Granada and Mercury Monarch automobiles for which it is designed a unique and distinctive appearance and at the same time provides approximately thirty percent more usable trunk space by removing the spare tire from the trunk interior. The design of the gasoline filler extension tube makes the ATRAS kit an integral stationary part of the car while allowing access to the car trunk in the normal manner.

CONCLUSION OF THE SPECIFICATION

As joint inventors we regard the subject matter of the ATRAS SPARE TIRE MOUNTING KIT that which has been outlined in the foregoing specification.

What is claimed is:

1. A kit which permits the positioning of a standard size spare tire outside of and rearwardly of the trunk of an automobile, which automobile (1) is otherwise devoid of a permanent, stationary rearward assembly for so positioning a spare tire, (2) includes a fuel filler port located rearwardly and centrally of the automobile trunk and (3) includes a rear bumper, said kit comprising:
   a. a circular metal housing sized to encompass the spare tire;
   b. a rear panel sized to cooperate with said circular metal housing for enclosing the spare tire;
   c. said rear panel having a fuel port filler door therein;
   d. a metal unit including (1) a unitary mounting plate adapted to be bolted in a vertical position externally of the automobile trunk, (2) a tubular protective housing extending from said mounting plate, and (3) a wheel mounting hub attached to said protective housing for carrying the spare tire;
   e. a fuel conduit extension tube adapted to be inserted within said protective housing for extension between the fuel filler port of the automobile and said fuel port filler door;
   f. a studded metal cinch for securing together said circular metal housing and said rear panel; and
   g. at least one bumper extension telescoping rod for permitting rearward repositioning of the automobile bumper to provide space for accommodating said metal housing.

2. A kit as in claim 1 wherein said fuel conduit extension tube has two ends, one of said ends having means thereon for cooperation with part of the automobile to retain said fuel conduit extension tube in operative position, the other of said ends being concealed behind said fuel port filler door when said fuel conduit extension tube is retained in operative position.

3. A kit as in claim 1 further comprising a metal plate adapted to be vertically mounted internally of the vehicle trunk for cooperation with said unitary mounting plate to mount said metal unit.

4. A kit as in claim 1 wherein there are two of said bumper extension telescoping rods.

5. A kit as in claim 1 or claim 2 or claim 3 or claim 4 wherein said metal studded cinch is semi-circular.

* * * * *